ated scrapers.
UNITED STATES PATENT OFFICE.

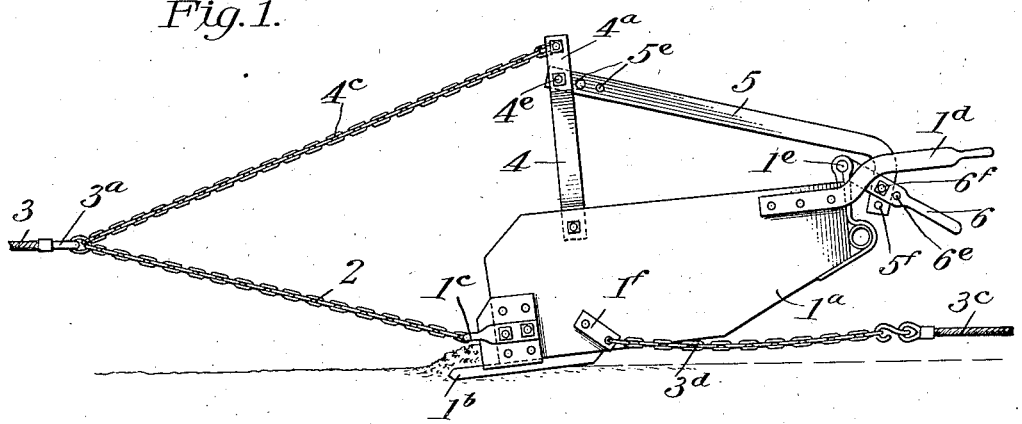
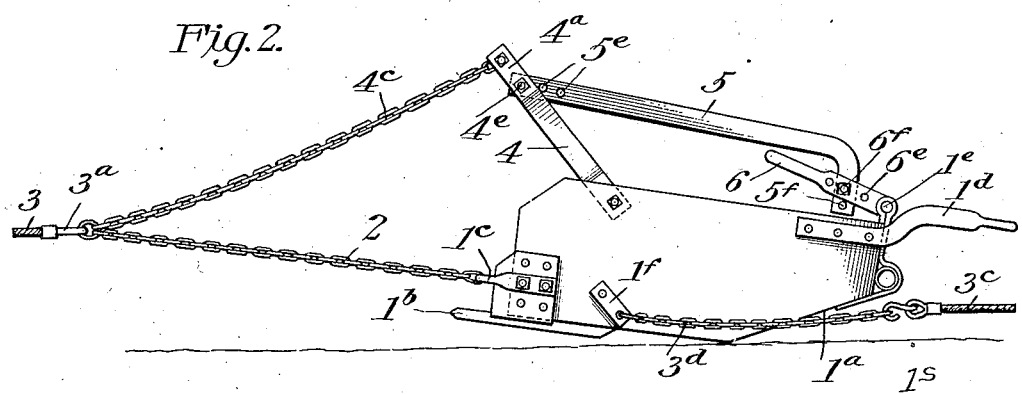
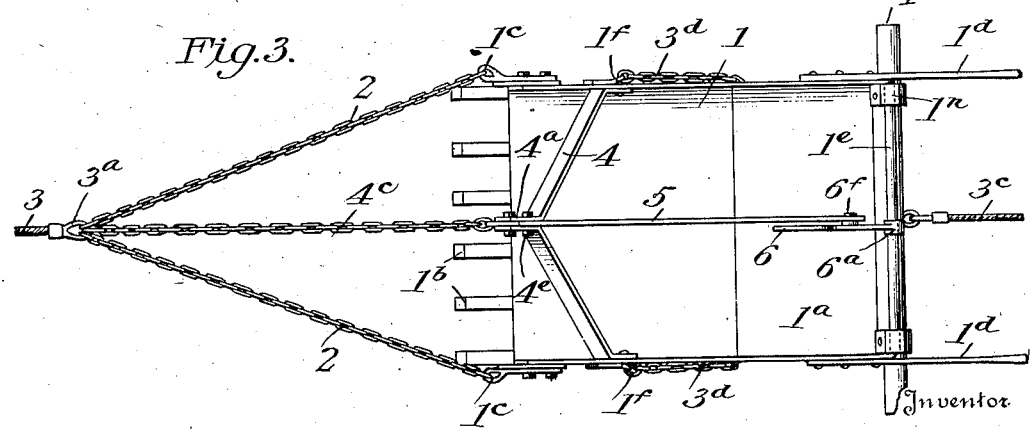

IRA E. BURKETT, OF MACON, GEORGIA, ASSIGNOR TO SCHOFIELD-BURKETT CONSTRUCTION CO., OF MACON, GEORGIA, A CORPORATION OF GEORGIA.

EXCAVATING-SCRAPER.

1,095,155.

Specification of Letters Patent. Patented Apr. 28, 1914.

Application filed August 13, 1913. Serial No. 784,588.

*To all whom it may concern:*

Be it known that I, IRA E. BURKETT, a citizen of the United States, residing at Macon, in the county of Bibb and State of Georgia, have invented certain new and useful Improvements in Excavating-Scrapers; and I hereby declare that the following is a full, clear, and exact description thereof, reference being had to the accompanying drawings, which form part of this specification.

This invention is a novel improvement in excavator scrapers, and the object of the invention is to provide a scraper with novel attachment whereby the draft on the scraper can be utilized to force the same into the ground and cause the scraper to automatically pull the load as it is drawn forward or to keep the scraper out of the ground when loaded, or when transporting the scraper from one point to another.

The invention is particularly adapted for use in connection with the apparatus shown in my Patent No. 1,000,988, dated Aug. 22, 1911 for excavator and loading apparatus, but is also useful with horse power operated scrapers.

I will explain the invention more in detail with reference to the construction illustrated in the accompanying drawings; which shows one practical embodiment of the invention; although I do not consider the invention restricted to the form illustrated in said drawings, as it can be varied within the scope of the invention.

In said drawings: Figure 1, is a side elevation of the scraper in loading position. Fig. 2, is a similar view showing it in "hauling" position. Fig. 3, is a top plan view of the scraper.

The scraper 1 may be of any desired form, and is shown as of the "scoop" type and formed of metal. The rear part of the bottom of the scraper is upwardly inclined as at 1ª, and the front edge of the scraper is provided with teeth 1ᵇ. To the sides of the scraper near their forward ends are attached draft eyes 1ᶜ; and at the rear ends of the sides handles 1ᵈ. These may all be of the usual type.

To the eyes 1ᶜ is attached a draft chain 2, which is connected to an eye 3ª, which may be attached to a hauling cable or chain 3, or to any other draft appliance, by which the scraper can be drawn forward.

To the sides of the scraper, near their forward ends, is pivotally attached a yoke 4 which has an upstanding central shank 4ª, to which is pivotally connected the forward end of a bar 5, the rear end of which is preferably downturned and also pivotally connected to a lever 6, which in turn is pivotally connected at 6ª to a rod 1ᵉ secured to eyes 1ⁿ on the back of the scraper. The shank 4ª of the yoke 4 is connected by a chain 4ᶜ with the draft ring 3ª. The lever 6 can be shifted to the positions shown in Figs. 1 and 2; and when thrown to the position shown in Fig. 1, the yoke 4 is pulled backward, thereby tensioning the chain 4ᶜ and lifting the rear end of the scraper, (as shown in Fig. 1) so that when the scraper is pulled forward, the teeth thereof will bite into the earth and the scraper will be automatically loaded as it is drawn forward. When it is loaded the lever 6 can be thrown forward to the position shown in Fig. 2, whereupon the chain 4ᶜ is slackened and the rear end of the scraper lowered, and the draft on the chain 2 will pull the front end of the scraper upwardly out of the ground, as indicated in Fig. 2, so that the loaded scraper can be readily drawn along the surface of the ground without digging into the earth, thus greately reducing the power required to move it forward. Thus by simply throwing the lever 6 forward or backward, the pull on the draft chain can be utilized to cause the scraper to load, or to ride freely over the surface of the ground.

To insure the proper bite of the teeth in the ground; and to vary the bite according to the nature of the soil being operated on; the bar 5 may be adjustably connected to the yoke and to the lever in any suitable manner. A convenient means, illustrated in the drawings, is to form the bar 5 with a series of apertures 5ᵉ in its forward end, any of which may be engaged with a bolt 4ᵉ attached to the shank 4ª and to form the rear end of the bar 5 with series of apertures 5ᶠ any one of which may be engaged with the bolt 6ᶠ fastened to the lever 6. Said lever 6 may also be provided with a series of apertures 6ᵉ, with any one of which the bolt 6ᶠ may be engaged.

When the invention is applied to a power operated scraper, (such as shown in my patent aforesaid) the scraper may be drawn back by means of a draft cable 3ᶜ connected by chains 3ᵈ to draft eyes 1ᶠ on the scraper, as indicated in the drawings.

It will be observed that the pivotal connection between the bar 5 and the lever 6 is such that when the lever 6 is thrown backward into hauling position, the pivot 6ᶠ drops below the pivot 6ᵃ, so that the lever is automatically locked in this position and cannot be raised by any pull upon the yoke.

In operating this scraper, it may be drawn backward, while in hauling position, to the point of loading; then the attendant can throw the lever 6 to the position indicated in Fig. 1; and when the scraper is pulled forward, the pull on the chain 4ᶜ first raises the rear end of the scraper and causes its forward edge to bite the ground until the scraper is fully loaded; then the operator throws the lever 6 to the position shown in Fig. 2, the draft on the chain 4ᶜ assisting him in doing this, and then the chain 4ᶜ is relaxed and the draft on the chain 3 draws the upper edge of the scraper out of the earth, and into hauling position as shown in Fig. 2 and it can slide along easily, over the ground. The pipe 1ˢ attached to the rear of the scraper is to support same at the dump, as described in my aforesaid patent.

The advantages and utility of the invention will be readily appreciated by those familiar with the use of such scrapers.

What I claim is:—

1. In combination with a scraper, a draft device attached to the forward end thereof, a lever pivoted to the rear of said scraper, a bar connected with said lever, and a connection between said bar and the draft device, and an intermediate connection between said bar and the forward portion of the scraper, whereby, by shifting said lever, the scraper may be adjusted to loading or hauling position.

2. In combination with a scraper; a draft appliance connected to the forward end thereof, a yoke pivoted on said scraper near its forward end, a lever pivoted to the rear end of the scraper, a connection between the yoke and lever, and a connection between said yoke and the draft appliance; whereby, by shifting said lever, the scraper can be set to loading or hauling position.

3. In combination with a scraper, a draft appliance attached to the forward end thereof, a yoke pivoted on said scraper near its forward end, a lever pivoted to the rear end of the scraper, a connection between the yoke and lever, and a connection between said yoke and the draft appliance, whereby, by shifting said lever, the scraper can be set to loading or hauling position.

4. In combination with a scraper, a draft appliance attached to the forward end thereof, a yoke pivoted on said scraper near its forward end, a lever pivoted to the rear end of the scraper, a bar adjustably connected to said lever and to said yoke, and a chain connecting said yoke and the draft appliance, whereby, by shifting said lever, the scraper can be set to loading or hauling position.

5. In combination with a scraper, a draft device attached thereto, a lever pivoted to the scraper in rear of the point of attachment of the draft chain, means connecting said lever to the draft device, and a yoke attached to said means and to the forward portion of the scraper, whereby, by shifting said lever the effective length of such connection can be varied to hold the scraper in loading or hauling position.

In testimony that I claim the foregoing as my own, I affix my signature in presence of two witnesses.

IRA E. BURKETT.

Witnesses:
CHAS. E. RIORDAN,
W. WALLACE NAIRN, Jr.